Patented Aug. 6, 1929.

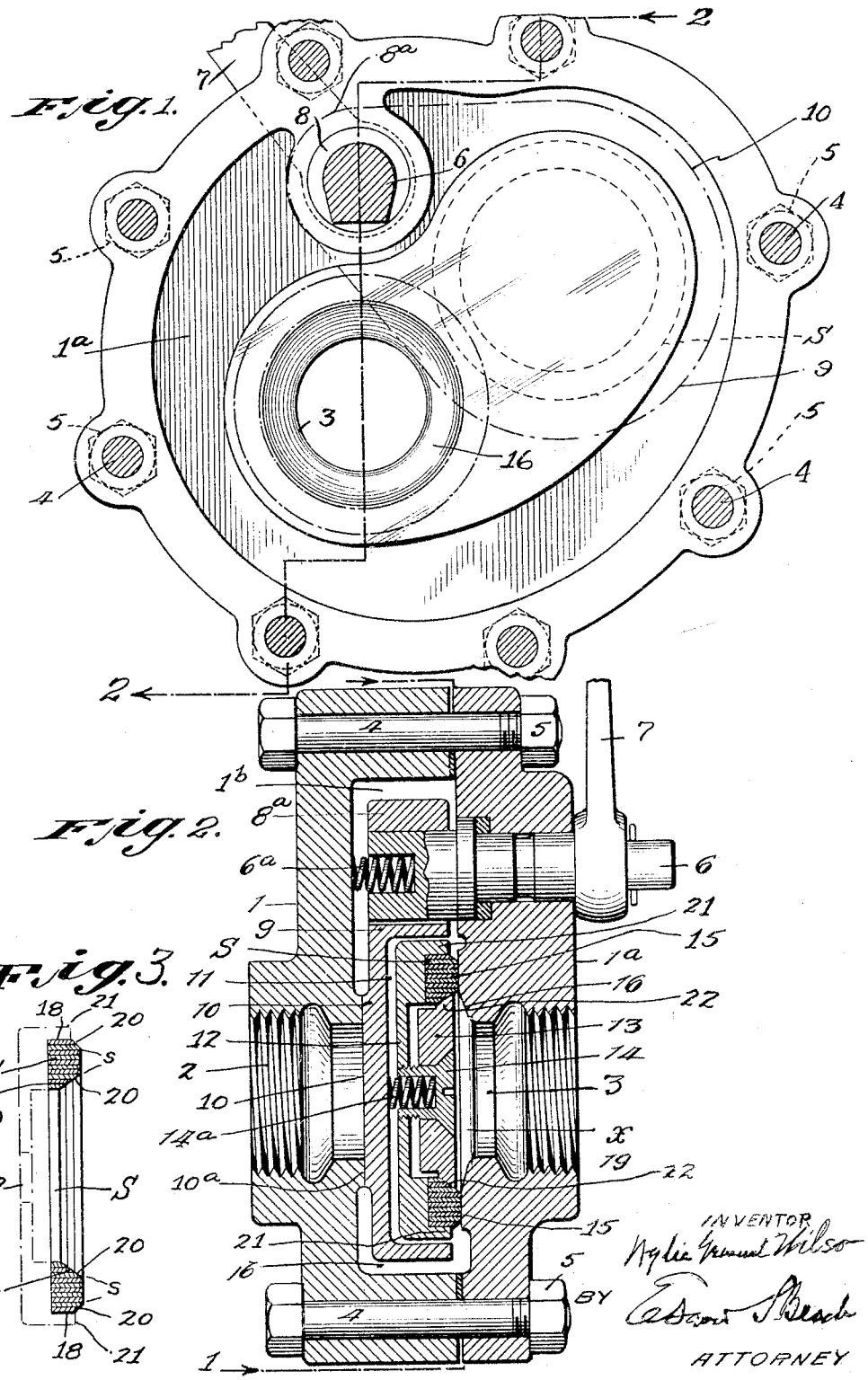

1,723,264

UNITED STATES PATENT OFFICE.

WYLIE GEMMEL WILSON, OF ELIZABETH, NEW JERSEY.

GATE VALVE.

Application filed January 6, 1926. Serial No. 79,574.

This invention relates to improvements in gate valves, and is shown embodied in a form of gate or slide valve known as the Everlasting valve and shown in a number of United States patents such as No. 937,088, of Oct. 19, 1909, for example. The object of the present invention is to produce a valve that will not leak when fluids or liquids pass through it under the high velocities and pressures now increasingly employed in various industries. Another object of the invention is to maintain the integrity of the sealing element of packing which cooperates with a metal, supplementary valve seat around the port, this being accomplished as described below. The sealing element of packing is shown as a ring and is preferably that shown and claimed in my application Ser. No. 79,568, filed January 6, 1926. For the purpose of the present invention, however, any suitable form of sealing element of packing may be employed.

In the accompanying drawings forming a part hereof and illustrating the invention in one form, Fig. 1 is a plan view of the ported member partly in section at line 1—1 of Fig. 2. The figure indicates by dotted lines a position of the sealing or packing element carrier holding a sealing ring when moved away from the port in an opening movement.

Fig. 2 is a cross-sectional view of so much of the valve as is necessary to be shown at line 2—2 of Fig. 1.

Fig. 3 is a sectional detail of the sealing ring with associated metal parts shown in dotted lines.

In the drawings, the bottom of the cupped valve casing 1 is shown with a flat supplementary casing member 1ª which forms a cover for the cupped member, member 1ª having a discharge port 3 to the main wall of which the numeral 3 is applied. The casing members 1 and 1ª are clamped together by bolts 4 and nuts 5. These associated members form a valve containing chamber 1ᵇ. Member 1ª is provided with an opening for a rotational stud 6 exteriorly provided with a handle 7. The stud projects into the casing chamber. Its oblong end therein is provided with a compression spring 6ª and this end of the stud is loosely fitted in an oblong opening in a marginal extension 8 of the cupped, outer carrier 9 movable sidewise in the chamber 1ᵇ. Member 9 has a bearing surface 10 and its cupped recess 11 contains a cup shaped sealing ring carrier 12 for the sealing ring S of packing, the bearing surface 10 being slidable across a flat valve seat 10ª around the intake port 2.

Sealing ring S is clamped in place by a keeper plate 13 which is held in place by a hollow screw 14 anchored in the bottom of the recess of carrier 12. A coiled pressure spring 14ª, one end of which presses against the bottom of the chamber of the screw and the other end of which presses against the bottom wall of the cupped member 9, is located in the hollow of the screw.

In the form of the invention herein shown, the annular sealing face s of the packing ring S makes continuous sliding contact, during opening and closing of the valve, with the metal valve seat 15 formed on member 1ª entirely around the port 3 and exteriorly to one side thereof. Main wall 3 of the outlet port flares annularly into a safety wall 16 that recedes annularly from the inner circumferential edge of the valve seat 15 to the annular main wall 3 of the discharge port. Sealing ring S has an interior circumferential dimension and area greater than the dimension and enclosed area of the discharge port wall 3 so that the sealing face of the sealing ring wholly encloses the receding safety wall 16. The recession of the wall 16 from the inner edge of the valve seat to the normal dimension of the main wall 2 of the discharge port forms a clear space x between the delivery edge of main wall 2 and the faces of the kepeer plate and the screw.

The recessive or receding wall 16 and chamber x insure prolongation of the wearing life of the sealing face of the sealing ring which is always of more or less yieldable material and is subjected to friction in its rubbing movements over and across the valve seat 15, when the valve is either opened or closed. The sealing face of ring S initially contacts only with valve seat 15. Such contact condition is shown. It endures for a considerable period but with ordinary packing rings, in the course of time, the inner circumferential corner portions of the sealing face of the packing ring will be forced or tend to be forced inwardly towards or into the discharge port; and, in prior constructions, have been forced into the discharge port to a greater or less extent, forming a projection beyond the main portion of the sealing face. The prior art result has quite frequently been that when the packing ring was slid in opening and closing movements over and across the opposed valve seat with its seat projecting portion, the projection formed has been rubbed against a usual sharp corner of the discharge end of the intake port, thereby fraying and disrupting the packing ring and causing a leaky joint. Wall 16, in the present invention, forms a safety wall, for even if the inner circumferential portion of the sealing ring be pressed projectingly in the direction of the intake port or over the peripheral corner of the keeper plate, the recessive or tapering wall 16, instead of forming a sharp or abrading corner of the port, forms a surface between the discharge edge of the discharge port 3 and the valve seat over which the projection, when and if it occurs, as it frequently does occur, compressively slides and yields so that it is not cut, torn or frayed, but is maintained in its full integrity for a great length of time. The importance of preventing abrasion and wear and tear of the sealing or packing rings in slide or gate valves is due to the fact that when once an abrasion or tear begins, it is rapidly communicated to adjacent portions of the sealing ring face and the valve becomes leaky.

The special form of sealing ring shown, but which is merely the preferred form, is made up of successive flatwise, superposed, strongly compacted or precompressed and united layers of asbestos or the like, forming a sealing member S, preferably in the form of a ring of stiff, but slightly elastic and compressible character. Its laminæ are indicated by $x'$. It has opposable clamping walls 18 and 19, wall 18 being its main peripheral wall and wall 19 being its main interior, circumferential wall; and on its sealing face side, the sealing face $s$ is between exposed, backwardly tapered, corner portions 20, each tapered portion being between the sealing surface and a clampable wall. The sealing surface $s$ is formed of edges of the united laminæ. The tapered surfaces are of laminæ edges. While these tapered edges perform no direct function in sealing, they definitely serve as supports one for the other and for the intermediate laminæ and also serve as spacers to hold the sealing surface $s$ apart from the side 21 of the cupped carrier 12. Such wall encloses the periphery of ring S, compressively clamps against the back portion of the wall 20 and the tapered peripheral wall 22 of the keeper plate. Said tapered spacing and supporting laminæ edges, together with the intermediate laminæ edges in the sealing face $10^a$ of ring S, project both beyond the edge of the enclosing cup wall 21 and the face of the keeper plate which is also a sealing ring compression plate. The result is that when the sealing ring is installed in position in the valve, the sealing edges in the sealing surface are given effective resistance against wear and tear, whereby the sealing ring is given a longer wearing life, and non-leakage of the seated valves is more certainly insured, the safety wall 16 serving materially as a leak preventer by keeping the sealing ring in condition to seal.

It is by no means essential that the sealing ring should be of the form shown, but it is necessary in connection with sealing surfaces of slightly elastic character that the sloping surface or safety wall adjacent the port and in the line of travel perform its valuable function of preventing the elastic sealing face, if pressed into the port, from being subsequently torn on the edge of the port in opening or closing the valve. The gently sloping safety wall permits the protrusion of the elastic sealing face but gently and gradually forces the protruding portions back to the level of the surface in actual sealing contact with the valve seat as those protruding portions approach that valve seat in opening or closing the valve. The safety wall forms a lateral enlargement of the sealing face or valve seat around the port and such wall is approximately cross-axial to the port in the form shown. This sloping wall feature of the invention may be widely employed in valve structures having either flat or curved surfaces adjacent a port.

What I claim is:

1. In a valve in which an elastic sealing ring passes across a port, the combination with a ported, rigid valve seat interiorly formed with an adjacent, rigid, gently sloping safety wall merging with a main port wall; a sealing ring fixed in a movable carrier; a sealing ring carrier; means for giving said sealing ring opening and closing movements relatively to the valve seat; and pressure effecting means operative to press the sealing ring, during its opening and closing movements, in a direction perpendicular to a plane coincident with the plane of the valve seat; said seating ring being of slightly elastic packing and having a sealing face projecting from the carrier, said sealing face being in part compressible againts both said valve seat around the port and said gently sloping safety wall, during closing and opening movements of the valve; said pressure being operative to project a portion of said elastic sealing ring against said valve seat and to project another portion of said ring against said gently sloping safety wall, and the latter then being effective gently to guide said projecting portion of the elastic sealing ring to the plane of said sealing ring face around the port.

2. In a valve, the combination with a slightly expansible sealing ring forming one sealing member for a port; of a complementary, rigid, port sealing member cooperable with said sealing ring; and a rigid, rigidly supported, gently sloping safety wall located for opposition to the face of said sealing ring and effective to receive a projection of the sealing ring and thereafter to guide said projection back into the plane of the sealing ring face.

3. In a valve, the combination with a slightly expansible sealing ring forming one sealing member for a port; of a complementary rigid, port sealing member cooperable with said sealing ring, and a rigid, rigidly supported, gently sloping safety wall located for opposition to the face of said sealing ring and effective to receive a projection of the sealing ring and thereafter to guide said projection back into the plane of the rigid sealing member.

4. In a valve structure the combination with relatively movable, rigid, joint forming members, one of which includes a port and the other of which traverses the port and is a port closing member; of a sealing ring carried by one of said members and having a portion projectible into said port; and means including a gently sloping wall for guiding said projectible portion, when and if projected, back into normal position.

5. In a valve, the combination with a slightly expansible sealing ring forming one sealing member for a port; of a complementary rigid, port sealing member co-operable with said sealing ring, and a rigid, gently sloping safety wall located for opposition to the face of said sealing ring and effective to receive a projection of the sealing ring and thereafter to guide said projection back into the plane of the rigid, sealing member.

6. In a valve, the combination with a slightly expansible sealing ring forming one sealing member for a port; of a complementary, port sealing member cooperable with said sealing ring, and a gently sloping safety wall located for opposition to the face of said sealing ring, and effective to receive a projection of the sealing ring and thereafter to guide said projection back into the plane of the sealing member.

Signed at New York in the county of New York and State of New York this 23" day of December, A. D. 1925.

WYLIE GEMMEL WILSON.